US006250473B1

(12) United States Patent
Golightley et al.

(10) Patent No.: US 6,250,473 B1
(45) Date of Patent: Jun. 26, 2001

(54) METHOD AND APPARATUS FOR SEPARATING FAST SETTLING PARTICLES FROM SLOW SETTLING PARTICLES

(75) Inventors: R. Mark Golightley, Cuyahoga Falls; Phillip G. Morgan, Canal Fulton, both of OH (US); James H. Wilhelm, Sandy, UT (US); John W. College, Pittsburgh, PA (US)

(73) Assignees: FirstEnergy Ventures Corp., Akron, OH (US); Codan Development Limited Liability Company, Sandy, UT (US); Dravo Lime, Inc., Pittsburgh, PA (US)

( * ) Notice: Subject to any disclaimer, the term of this patent is extended or adjusted under 35 U.S.C. 154(b) by 0 days.

(21) Appl. No.: 09/193,381

(22) Filed: Nov. 17, 1998

(51) Int. Cl.$^7$ ............................................... B03B 5/66
(52) U.S. Cl. ................................. 209/159; 209/158
(58) Field of Search ................................. 209/159, 158, 209/173, 172, 162, 163, 169

(56) References Cited

U.S. PATENT DOCUMENTS

| | | | |
|---|---|---|---|
| 2,767,847 | 10/1956 | Russell et al. ................. | 210/51 |
| 2,906,401 | * 9/1959 | Katz ............................. | 209/159 |
| 3,915,865 | 10/1975 | Haji et al. ..................... | 210/329 |
| 3,951,779 | 4/1976 | Anderson ...................... | 208/11 |
| 3,954,415 | 5/1976 | Davitt .......................... | 23/270 R |
| 4,163,723 | * 8/1979 | Romano ........................ | 210/319 |
| 4,247,391 | 1/1981 | Lloyd ........................... | 209/164 |
| 4,301,001 | * 11/1981 | Lofthjouse ..................... | 209/17 |
| 4,426,282 | 1/1984 | Aunsholt ....................... | 209/167 |
| 4,483,768 | 11/1984 | Gazzoni ........................ | 209/18 |
| 4,539,103 | 9/1985 | Hollingsworth ................ | 209/158 |
| 4,575,418 | 3/1986 | Robbins ........................ | 209/3 |
| 4,778,598 | 10/1988 | Hoffman et al. ................ | 210/710 |
| 4,822,482 | * 4/1989 | Hollingsworth ................ | 209/158 |
| 5,132,027 | 7/1992 | Ukawa et al. .................. | 210/787 |
| 5,227,047 | 7/1993 | Hwang .......................... | 209/166 |
| 5,341,938 | 8/1994 | Valenzuela et al. ............ | 209/164 |
| 5,456,363 | 10/1995 | Groppo et al. ................. | 209/166 |
| 5,500,197 | 3/1996 | Gröne ........................... | 423/243.08 |
| 5,601,703 | 2/1997 | Szymocha ...................... | 209/164 |

FOREIGN PATENT DOCUMENTS

| | | | |
|---|---|---|---|
| 30483 | * 12/1930 | (AU) ............................. | 209/159 |
| 0 469 360 A2 | 7/1991 | (EP) . | |
| 0 585 103 A2 | 8/1993 | (EP) . | |
| 200231 | * 8/1889 | (FR) ............................. | 209/159 |
| 910020 | * 12/1945 | (FR) ............................. | 209/159 |
| 9193 | * of 1911 | (GB) ............................ | 209/159 |
| 2 050 201 | 5/1980 | (GB) . | |
| WO 92/19851 | 10/1993 | (WO) . | |

* cited by examiner

*Primary Examiner*—Donald P. Walsh
*Assistant Examiner*—Daniel K Schlak
(74) *Attorney, Agent, or Firm*—Renner, Kenner, Greive, Bobak, Taylor & Weber

(57) ABSTRACT

A hydroseparator for separating particles based on the differences in settling rates such as for separating fly ash from gypsum includes a substantially cylindrical side wall closed at its bottom end by a floor. A laminar upflow is created through the hydroseparator by adding dilution water to the bottom of the hydroseparator and removing most of the added dilution water from the top of the hydroseparator. The remaining volume of liquid is removed in an underflow. The hydroseparator is divided into at least two sections by a baffle that extends about the interior of the side wall. An inlet is disposed in the center of the hydroseparator slightly above the baffle such that the material added to the hydroseparator to be separated is inserted into the section of the hydroseparator completely surrounded by the baffle. The velocity of the upflow is controlled such that it is not fast enough to cause the faster-settling gypsum particles to rise but is fast enough to cause the slower-settling fly ash particles to rise with the upflow. The upflow thus separates the fly ash from the gypsum and floats the fly ash to the top of the hydroseparator where it is removed in the overflow. An agitator is provided in the lower portion of the hydroseparator to evenly distribute wash water and to keep the gypsum fluid.

2 Claims, 8 Drawing Sheets

METHOD AND APPARATUS FOR SEPARATING FAST SETTLING PARTICLES FROM SLOW SETTLING PARTICLES

TECHNICAL FIELD

This invention generally relates to a method and apparatus for separating particles and, more particularly, to a method and apparatus that relates to a hydroseparator that separates particles based on the differences in settling rates of the particles. Specifically, the present invention relates to a method and apparatus for separating particles in a hydroseparator by using an upflow that causes the slower-settling particles to rise with the upflow where they are removed in an overflow while allowing the faster-settling particles to settle to the bottom of the apparatus where they are removed in an underflow. The apparatus and method of the present invention is illustratively described as separating commercially-valuable gypsum particles from fly ash particles in a flue gas desulfurization process. The apparatus and method of the present invention may also be used with other particle mixtures such as the mixtures that are normally produced in mining and mineral grinding circuits.

BACKGROUND OF THE INVENTION

Separating particles in large volumes is a significant problem in many industries. Separation is desirable when one or more types of the particles has commercial value. Separation is also used when a mixture of particles having one environmentally undesirable component must be discarded in an expensive manner. In such a situation, it is desired to separate the environmentally undesirable particles from the other particles so that the volume of material that must be expensively discarded may be reduced. One example of a use for a process that separates commercially-valuable particles from other particles is separating gypsum from fly ash in a flue gas desulfurization process.

Burning coal to create electricity is one of the main sources of electrical power in the United States. In the past, the byproducts produced from burnt coal were exhausted from a smokestack into the atmosphere. As public awareness grew about the harmful environmental effects of such practices, the public demanded that the exhaust from power plants be cleaned prior to being emitted from a smokestack.

A flue gas desulfurization process is a common cleaning process used in coal-fueled power plants. One drawback to the process is that a large quantity of fly ash-contaminated hydrated calcium sulfate is produced as a byproduct of the process. Hydrated calcium sulfate is commonly referred to as gypsum and is commonly used to manufacture plaster of paris and wall board. Disposing of the fly ash-contaminated gypsum is a problem for power companies that significantly increases the expense of cleaning the exhaust. It has thus been desired in recent years to find uses for the byproducts of the flue gas desulfurization process and other cleaning processes in order to offset the costs of the cleaning process.

Practical uses for the gypsum byproduct produced during a flue gas desulfurization process include using the gypsum to form plasters and to fabricate wall board. Unfortunately, the gypsum extracted directly from many flue gas desulfurization processes is not immediately commercially useable because it is contaminated with a relatively large amount of fly ash. Although fly ash does not significantly alter the structural properties of the gypsum, the fly ash darkens the color of the gypsum causing it to lose its commercial value. More significantly, fly ash reduces adhesion of the paper to the board and also increases board weight. It is thus desired in the art to provide a method and apparatus for efficiently removing fly ash from relatively large quantities of gypsum.

Known methods for separating fly ash from gypsum produced in flue gas desulfurization systems utilize hydroclones, screens, or hydroseparators. Gypsum is commercially desirable for wall board applications only when it has a purity of 92 percent and above. To date, the methods and apparatus known in the art for separating wall board-quality gypsum from the byproducts of flue gas desulfurization systems have not economically and consistently achieved wall board-grade gypsum.

One such known system uses a hydroclone to separate the fly ash from the gypsum. A hydroclone system uses pump discharge pressure to accelerate particles in the hydroclone. The thickened, coarse gypsum particles are pushed to the circumference of the hydroclone by centrifugal force and are concentrated in the underflow while the smaller particles and water move to the axis of the hydroclone where they are removed in the overflow. The high shear rates and the low residence time in the hydroclone environment do not effectively separate the particles causing the underflow to be contaminated with the fine fly ash particles. The overflow also contains an undesirable quantity of the gypsum. Adding hydroclones in series increases the separation quality but also increases the expense of fabricating and operating the system.

Screens have also been used to separate fine particles from coarse particles in applications such as separating fly ash from gypsum. Screens are difficult to effectively employ when the difference in particle size is small and when the particles themselves are small. In the case of separating fly ash from gypsum, appropriately-sized screens are prone to clogging and are subjected to an undesirable amount of abrasive forces. It has also been found that a large number of screens are necessary to adequately separate gypsum from fly ash. In addition to the other problems with the screens, the number of screens impractically increases the expense of the system.

Other separation systems include the use of other hydroseparator designs that separate particles based on differences in settling characteristics. Such devices have various problems that make them inefficient, including difficulties in achieving uniform distribution of the rising liquor and/or wash water and inadequate dampening of the kinetic energy of the feed slurry. Some of these devices are also incapable of efficiently displacing mother liquor containing fines from the coarser particles. Separation systems that use flotation require the added expense of flotation agents and the high energy cost of supplying air for froth formation. In addition, there must be a chemical difference between the surfaces of the fines and coarse particles for the flotation agents to work effectively. It is thus desired in the art to provide a method and apparatus for separating gypsum from fly ash such that the resulting separated gypsum is pure enough to use in a wall board fabrication operation.

Another situation where it is desirable to separate particles is in the recovery of clay. The desirable clay is typically contaminated with grit. In known recovery processes, a significant amount of clay remains in the grit resulting in a loss of about 10% of the clay product. It is desired in the art to provide a method and apparatus for separating the clay from the grit that is more efficient.

The method and apparatus of the invention should thus be capable of separating particles with slow settling characteristics from particles with fast settling characteristics in a wide variety of applications. The desired system must be efficient, effective, substantially maintenance-free, inexpensive to operate, and easily adjustable to accommodate different flow rates and concentrations of different types of particles.

SUMMARY OF THE INVENTION

It is therefore an object of the present invention to provide a method for separating particles efficiently in large volumes.

Another object of the present invention is to provide a method for separating particles based on the differences in the settling characteristics of the particles.

Still another object of the present invention is to provide a method for separating particles that does not use aeration or flocculation.

Yet another object of the present invention is to provide a method for separating particles that is easy to control and adjust in response to different flow rates into the system and differing concentrations of particles.

A further object of the present invention is to provide a method for separating particles that uses a single hydroseparator to achieve the separation.

Still a further object of the present invention is to provide a method for separating particles that uses a laminar upflow to lift the particles having a slower settling rate while allowing the particles with faster settling rates to settle.

Yet a further object of the present invention to provide a method for separating fly ash from gypsum.

An additional object of the present invention is to provide a method for separating fly ash from the gypsum produced in a flue gas desulfurization process to a degree that allows the recovered gypsum to be used for commercial wall board and plaster.

Another object of the present invention is to provide an apparatus for separating particles that is designed to foster a laminar upflow from a lower section to an upper section.

Yet another object of the present invention is to provide an apparatus for separating particles that includes a central baffle that separates the upper section of the apparatus from the lower section.

Still another object of the present invention is to provide an apparatus for separating particles that has an input located between the upper and lower sections such that an input slurry entering the apparatus collides with the upflow between the sections.

An additional object of the present invention is to provide an apparatus for separating particles that includes an outlet that maintains a laminar flow in the apparatus.

Still another object of the present invention is to provide an apparatus for separating particles that is of relatively simple construction, that achieves the stated objectives in a simple, effective, and inexpensive manner, and that solves the problems and that satisfies the needs existing in the art.

These and other objects and advantages are obtained by the hydroseparator of the present invention, the general nature of which may be stated as including a hydroseparator (10, 150, 200, 300, 400), including a sidewall (11, 151, 211, 311, 411) having an upper end (12, 152, 212, 312, 412) and a lower end (13, 153, 213, 313, 413); a floor (14, 154, 214, 314, 414) connected to the lower end of the sidewall, the floor closing the bottom of the sidewall to form a tank; a baffle (26, 166, 226, 326, 426) connected to the tank to divide the tank into an agitation section (24, 164, 224, 324, 424) and a laminar flow section (20, 160, 220, 320, 420); the agitation section being disposed below the baffle; the laminar flow section being disposed above the baffle; the tank having a first inlet (40, 170, 240, 340, 440), an overflow outlet (72, 194, 272, 372, 472), and an underflow outlet (18, 158, 218, 318, 418); the overflow outlet disposed adjacent the upper end of the sidewall; the underflow outlet disposed adjacent the lower end of the sidewall; the first inlet disposed above the agitation section; an agitator (58, 188, 258, 358, 458) disposed in the agitation section; and means for driving (54, 184, 254, 354, 454) the agitator.

Other objects and advantages are achieved by the method for separating fly ash from gypsum of the present invention, the general nature of which may be stated as including the steps of adding a slurry of particles into the hydroseparator, some of the particles having faster settling rates with other particles having slower settling rates; adding dilution water into the bottom of a hydroseparator; removing material from the top of the hydroseparator to an upflow; controlling the flow rate of the upflow such that the particles having slower settling rates are lifted by the upflow while the particles having faster settling rates fall down through the upflow; and removing the particles having faster settling rates from the bottom of the hydroseparator.

BRIEF DESCRIPTION OF THE DRAWINGS

The preferred embodiments of the invention, illustrative of the best modes in which the applicants contemplated applying the principles of the invention, are set forth in the following description and are shown in the drawings and are distinctly pointed out and set forth in the appended claims.

Similar numbers refer to similar elements throughout the specification.

DESCRIPTION OF THE PREFERRED EMBODIMENTS

The hydroseparator of the present invention is indicated generally by the numeral 10 in the accompanying drawings. Hydroseparator 10 is configured to separate particles that are fed into hydroseparator 10 based on the differences in the settling characteristics of the particles. Hydroseparator 10 is designed to lift the particles having slower settling characteristics to the top of hydroseparator 10 while allowing the particles having faster settling characteristics to fall to the bottom of hydroseparator 10. Hydroseparator 10 may be used in a wide variety of applications where the particles being separated have different settling characteristics.

Figure 1:
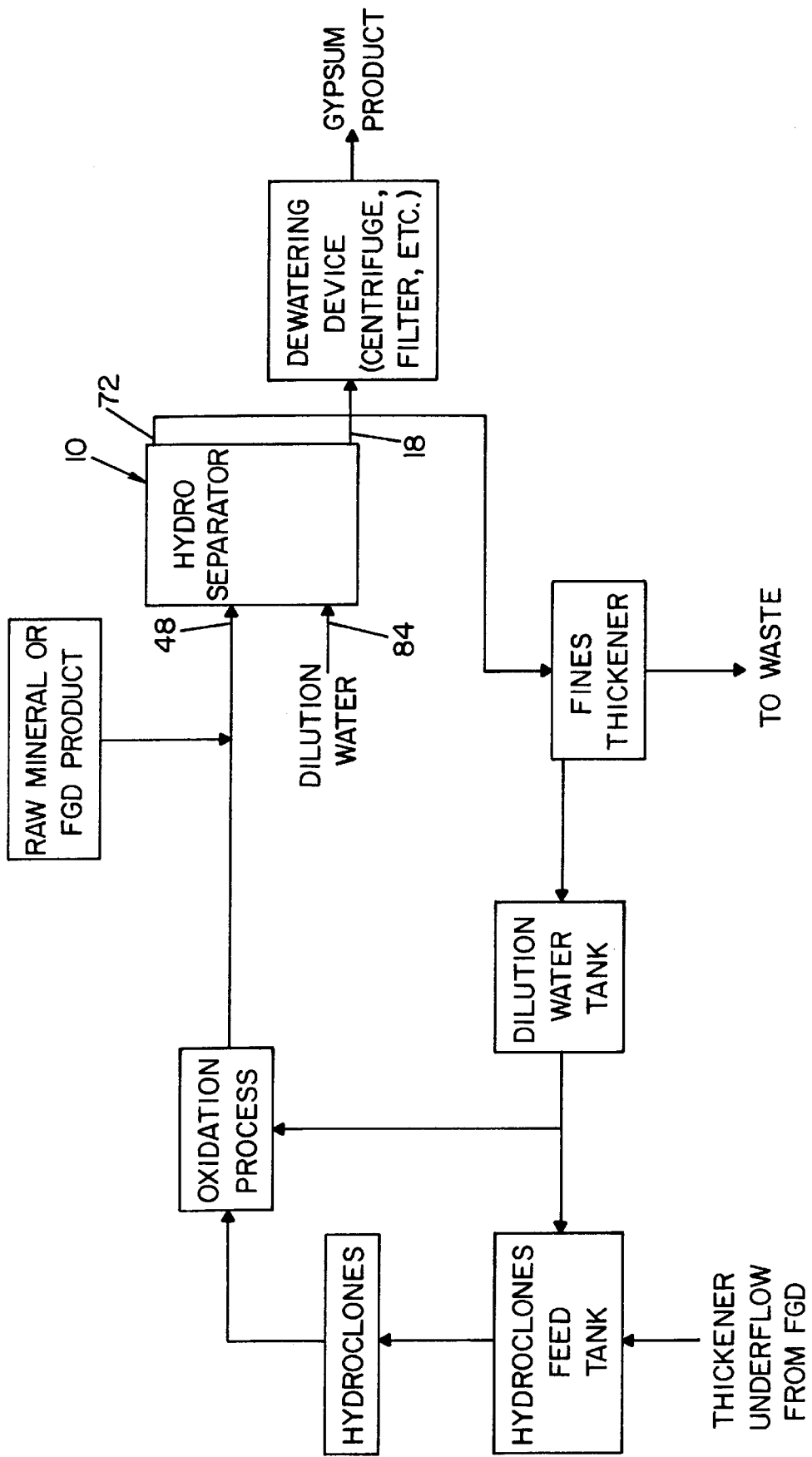
FIG. 1 is a schematic flow chart depicting the relative position of the hydroseparator of the present invention in the overall process of obtaining high quality gypsum from a flue gas desulfurization process.

In the first embodiment of the invention, hydroseparator 10 is used to separate gypsum from fly ash in a flue gas desulfurization process. The location of hydroseparator 10 is depicted in FIG. 1 with respect to the other elements of a gypsum recovery and purification process that cooperates with a flue gas desulfurization process. Hydroseparator 10 may also be used in other particle separation applications where the particles to be separated have different settling rates. For example, hydroseparator 10 may be used to separate coarse limestone from more finely ground limestone in a ball mill grinding circuit, separating clay fines from coarser minerals and ground rock in a mining circuit, separating coarser grit from well-slaked lime in a lime slaking circuit. Hydroseparator 10 is depicted and described with respect to a flue gas desulfurization process only to provide an example of the use of hydroseparator 10 and the description that follows may be applied to other processes where mixed particles must be separated without departing from the concepts and spirit of the invention.

In the exemplary embodiment of the present invention, a slurry from the flue gas desulfurization process is first processed through a hydroclone to remove very coarse impurities such as grit and rock. The resulting slurry is then suitably processed in a known oxidation process prior to entering the hydroseparator 10.

The underflow of hydroseparator 10 is where the high quality gypsum that has been separated from the fly ash is obtained. The underflow is directed to a dewatering device such as a centrifuge or a filter to remove the water from the gypsum leaving the gypsum in a form that may be sold to a wall board fabrication operation. The overflow of hydroseparator 10 contains the fly ash removed from the gypsum. The overflow is sent through a thickening stage or process to remove the liquid from the fly ash with the liquid being recycled back into the beginning of the process.

Hydroseparator 10 separates the fly ash from the gypsum by using the different settling rates of the materials to separate the smaller fly ash particles from the larger gypsum particles. Hydroseparator 10 achieves a desirable separation by utilizing the difference between the drag force on a particle and the gravitational force on a particle. In laminar fluid flow, Stoke's law generally states that the terminal settling velocity of spherical particle is proportional to the product of the square of its diameter and the difference in specific gravity between the particle and the liquid medium, and inversely proportional to the viscosity of the fluid. If the rate at which the surrounding liquid is rising in the column is higher than this terminal settling velocity, the particle will rise and be carried out the overflow. If not, the particle will fall and report to the underflow.

Hydroseparator 10 separates the particles by creating a laminar upflow through the settling mixture of fly ash and gypsum. Each particle establishes a terminal settling velocity in the rising column of liquid based on its diameter and specific gravity compared to the surrounding liquid and the viscosity of that liquid. If the settling velocity of the particle exceeds the rising velocity of the liquid, the particle settles to the lower agitated section of the hydroseparator. The particles with lower terminal settling velocities are carried upward by the rising column of liquid, and eventually are removed from the top of hydroseparator 10. The upflow in hydroseparator 10 can be controlled to provide a velocity that lifts the slow-settling particles while allowing the fast-settling particles to drop even though the slow-settling particles have a higher specific gravity than the fast-settling particles. As noted above, however, Stoke's Law applies in laminar flow regions and it is thus an important objective of the present invention to provide a laminar flow in hydroseparator 10 where the separation can occur.

The degree and quality of the separation may be tightly controlled by adjusting the flow rate of the upflow through hydroseparator 10. The flow rate of the upflow should be slightly less than the flow rate that starts to carry gypsum particles out of the overflow of hydroseparator 10. The flow rate can be tightly controlled by varying the flow rate of feed slurry into the mixing zone and by fine tuning with the flow rate of dilution or wash water added to the bottom of hydroseparator 10. This addition of dilution or wash water is a key element in purifying the coarse gypsum product. The wash water not only creates the laminar upflow through hydroseparator 10 but also washes the final fly ash particles out of the gypsum particles at the bottom of hydroseparator 10.

Having now described the theory behind hydroseparator 10, the structure of hydroseparator 10 is now described with reference to FIGS. 2 through 6. Hydroseparator 10 includes a generally cylindrical tank having a cylindrical sidewall 11 with an upper end 12 and lower end 13, closed at the latter by a floor 14 to form the tank. Floor 14 may be sloped toward a drain 16 and an underflow outlet 18. In some embodiments of the invention, floor 14 may be sloped approximately 2 degrees toward drain 16. Floor 14 may also be flat. For purposes of example, sidewall 11 may have a diameter of approximately 14 feet and a height of approximately 30 feet. Sidewall 11 and floor 14 may be fabricated from any of a variety of suitable materials known in the art such as aluminum, stainless steel, or plastic. The specific material is selected based on the corrosion and erosion characteristics of the fluid and material in hydroseparator 10.

Figure 2:
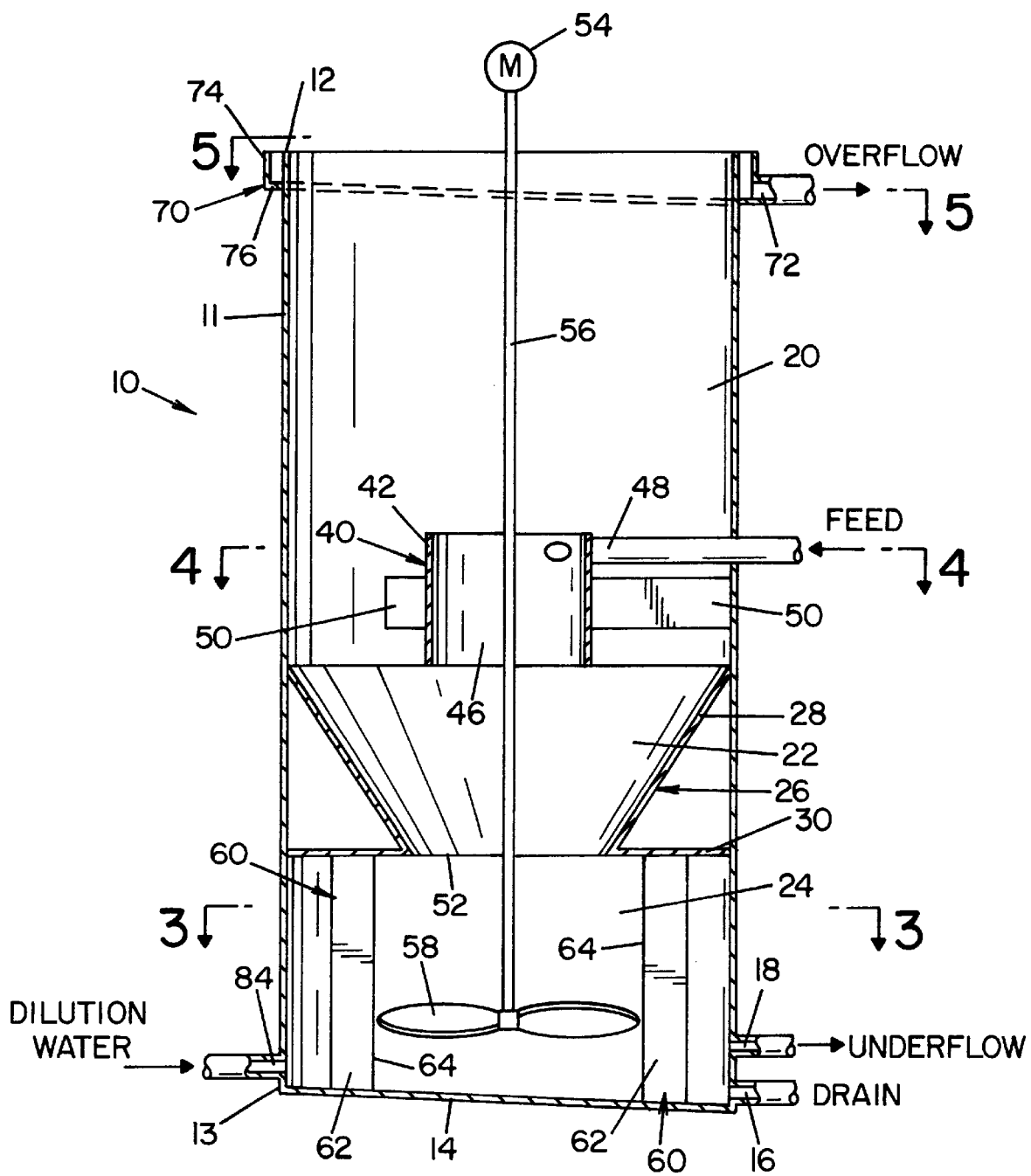
FIG. 2 is a front sectional view of the hydroseparator of the present invention.
Figure 3:
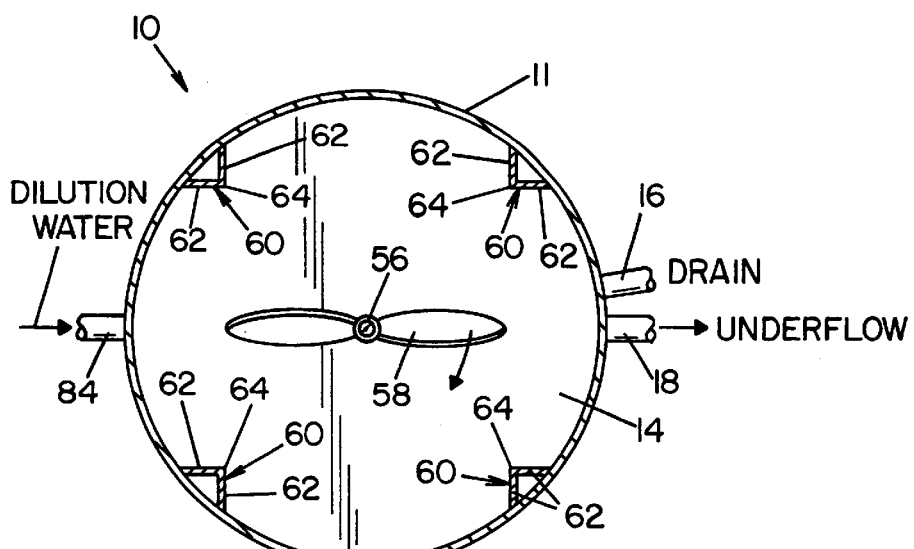
FIG. 3 is a sectional view taken along line 3—3 of FIG. 2.

Hydroseparator 10 is divided into a laminar flow section 20, and an agitation section 24 by a circumferential baffle 26. Baffle 26 is triangular in cross section as depicted in FIG. 2 and extends entirely about the inner surface of sidewall 11. In the embodiment of the invention depicted in FIGS. 2–6, the frustum-shaped area radially inward of baffle 26 provides an intermediate or transition section 22 disposed between agitation section 24 and laminar flow section 20. In further embodiments of the invention, some of which are described in more detail below, section 22 can be essentially eliminated. Baffle 26 includes a top, conical wall 28 and a bottom wall 30 with the latter being substantially perpendicular to sidewall 11. Baffle 26 may be on the order of approximately 6 feet tall and extend into hydroseparator 10 approximately 4 feet leaving an opening between agitation section 24 and intermediate section 22 having a 6 foot diameter. In other embodiments of the present invention, baffle 26 may be formed in other shapes. Further, the specific dimensions given here for baffle 26, sidewall 11, and floor 14 are for purposes of example only. The present invention contemplates that other dimensions may be used to achieve the concepts of the present invention.

Hydroseparator 10 further includes an inlet 40 that is in fluid communication with the source of particles that are to be separated. Inlet 40 includes a velocity retarding member in the nature of an inlet sidewall 42 that may be substantially cylindrically shaped to form an inlet chamber 46 above intermediate section 22 and in fluid communication with intermediate section 22 through the bottom of inlet 40.

Figure 4:
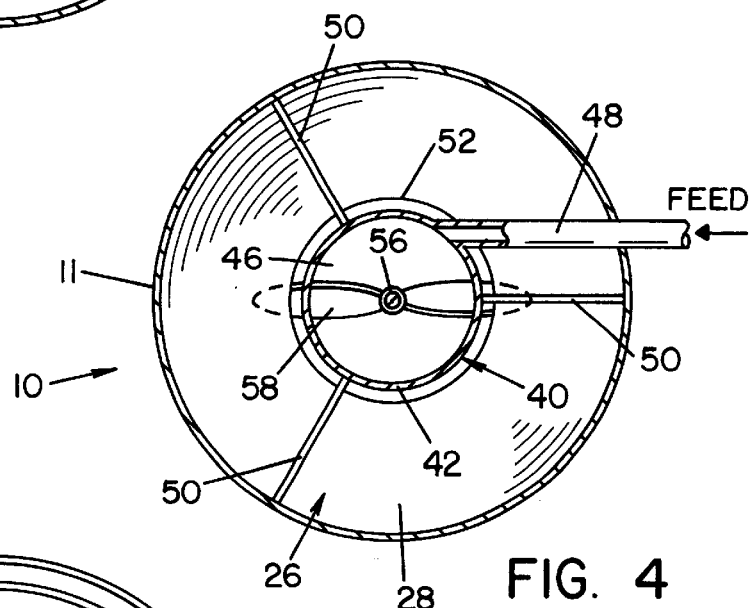
FIG. 4 is a sectional view taken along line 4—4 of FIG. 2.
Figure 5:
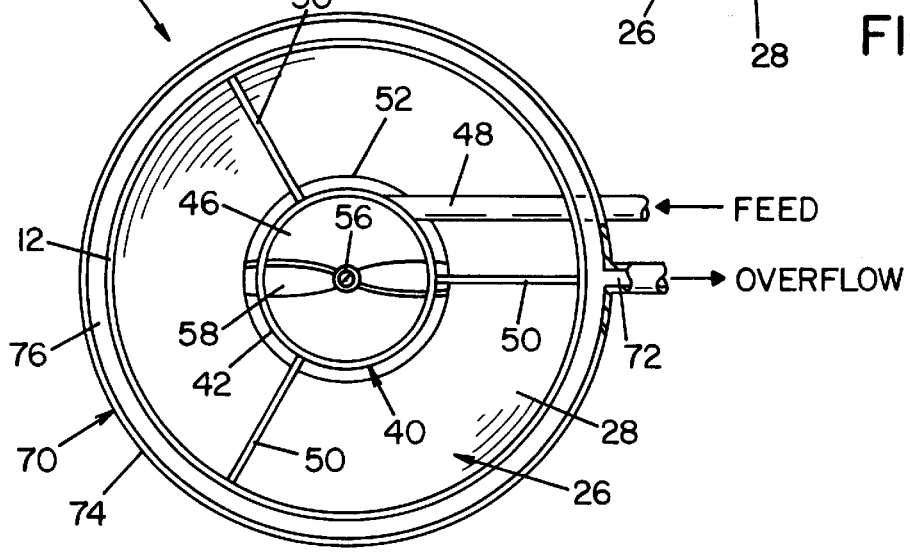
FIG. 5 is a sectional view taken along line 5—5 of FIG. 2.

An inlet tube 48 provides fluid communication between inlet chamber 46 and the source of material to be mixed. Inlet tube 48 extends from sidewall 11 to inlet sidewall 42 and is substantially horizontal. Tube 48 is not radially disposed with respect to sidewall 42. Rather, tube 48 is substantially tangential to inlet 40 as shown in FIGS. 4 and 5. The tangential location of inlet tube 48 allows the material added to inlet chamber 46 to be swirled in inlet chamber 46 prior to dropping into intermediate section 22 of hydroseparator 10. The swirling action gently dissipates the kinetic energy of the incoming slurry so that the fluid gently mixes with the contents of hydroseparator 10 to allow laminar flow to develop above and below the intermediate section 22.

Inlet 40 is supported inside hydroseparator 10 by a plurality of supports 50. Each support 50 extends from sidewall 11 of hydroseparator 10 to inlet sidewall 42. Supports 50 may be radially disposed and substantially horizontal as depicted in the drawings. Supports 50 are relatively thin in the direction of the upflow so as to not significantly interfere with the upflow in hydroseparator 10. Supports 50 may thus be thin rectangular beams or airfoil-shaped beams that do not create a significant interference to the upflow in hydroseparator 10.

Inlet 40 has a diameter that is smaller than the opening 52 between intermediate section 22 and agitation section 24 at the lower edge of baffle 26. The size of inlet 40 ensures that the material added to hydroseparator 10 will contact the upflow that moves from agitation section 24 through intermediate section 22.

Hydroseparator 10 further includes a variable speed motor 54 that is positioned above hydroseparator 10. A drive shaft 56 is connected to motor 54 and extends down the middle of hydroseparator 10, through inlet 40, and into agitation section 24. Motor 54 and shaft 56 may be supported by any of variety of known support arrangements. A low shear agitator 58 is connected to the end of drive shaft 56 such that it is fully disposed within agitation section 24 and disposed adjacent lower surface 14. In other embodiments of the present invention, other equivalent agitators may be used without departing from the concepts of the present invention. For example, the motor for driving the agitator may be disposed below floor 14 or within agitation section 24. The motor may also be disposed within the other sections 22 or 20 of hydroseparator 10.

A plurality of side baffles 60 are disposed in agitation section 24. Each side baffle 60 is connected to the inner surface of sidewall 11 and extends into agitation section 24. Each side baffle 60 includes a pair of vertical walls 62 joined at right angles with the connection 64 between walls 62 extending into agitation section 24. In the preferred embodiment of the present invention, four side baffles 60 are evenly disbursed about agitation section 24 and extend from floor 14 to bottom wall 30. Side baffles 60 direct the flow in agitation section 24 from floor 14 up toward bottom wall 30 where the flow is turned radially inwardly.

Hydroseparator 10 also includes an outlet channel 70 that is disposed at the top of hydroseparator 10. Outlet channel 70 is tilted toward an overflow outlet 72 such that particles that enter outlet channel 70 move down toward overflow outlet 72 and exit hydroseparator 10. In the preferred embodiment of the present invention, outlet channel 70 is disposed outside of sidewall 11 and includes an outlet sidewall 74 and an outlet floor 76. Outlet channel 70 completely surrounds the top of hydroseparator 10 allowing material to flow over sidewall 11 into channel 70 without creating a nozzled flow that would interfere with the laminar upflow in the laminar flow section 20.

The upflow in hydroseparator 10 is created by controlling the flows into and out of sections 20, 22, and 24. Underflow outlet 18 is disposed in agitation section 24 and allows an underflow to be removed from hydroseparator 10. In the preferred embodiment of the present invention, underflow outlet 18 is disposed above drain 16. A dilution water inlet 84 is also disposed in agitation section 24. Inlet 84 is in selective, controlled fluid communication with a supply of dilution water. The flow rates through inlet 40 and inlet 84 combined with the flow rates through underflow outlet 18 and overflow outlet 72 define the flow rate of the upflow through hydroseparator 10.

Figure 6:
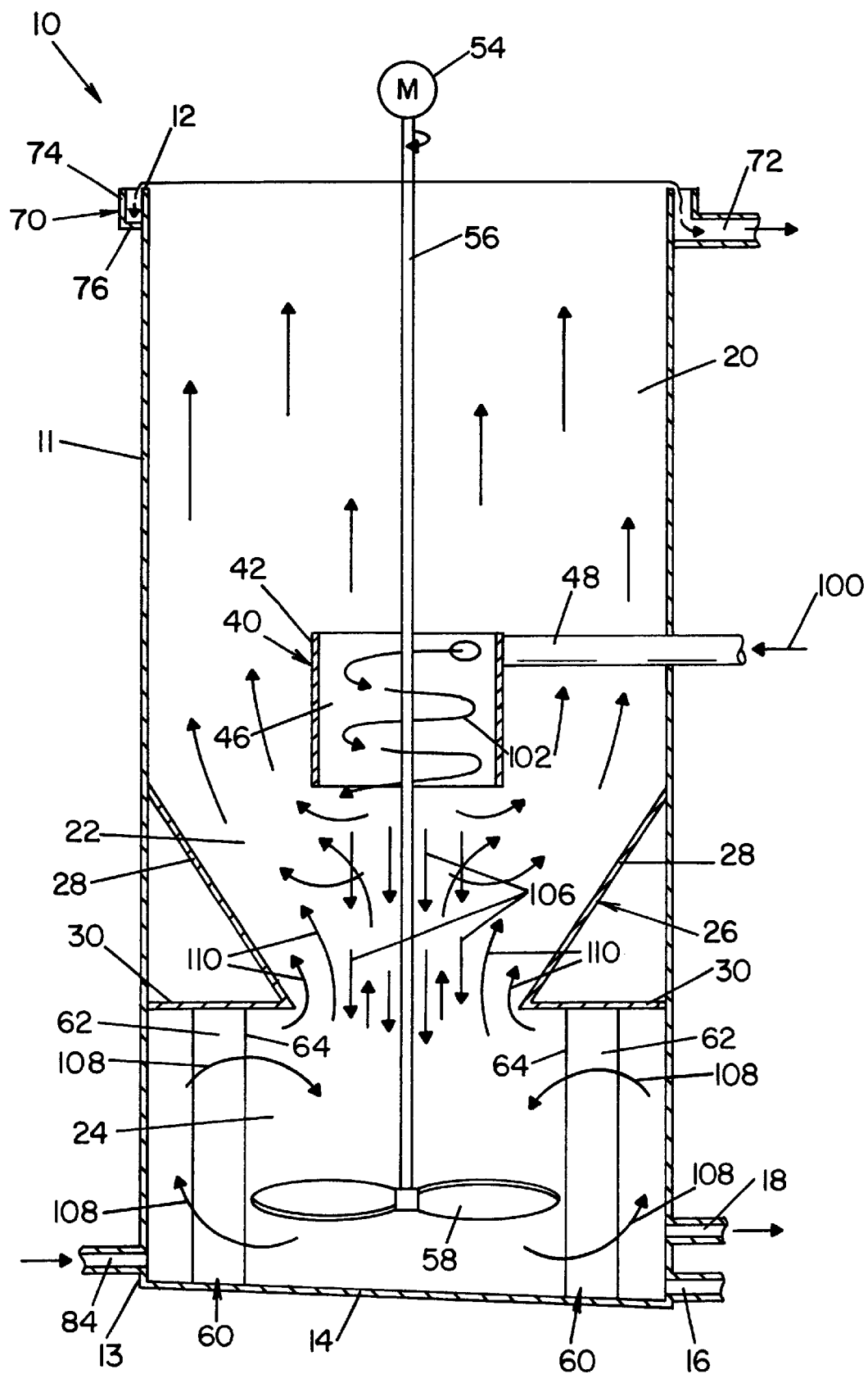
FIG. 6 is a view similar to FIG. 2 taken while the hydroseparator is operating with arrows indicating the flow paths inside the hydroseparator.

A schematic view of hydroseparator 10 during operation is depicted in FIG. 6. The various arrows present in FIG. 6 represent the direction of flow of the materials through hydroseparator 10. A slurry 100 of particles having different settling rates is added to hydroseparator 10 through inlet tube 48. Although hydroseparator 10 may be used with a variety of materials, the description that follows specifically refers to the separation of fly ash from gypsum in order to provide an example of the operation. In this example, slurry 100 includes the slower settling fly ash and the faster settling gypsum. Slurry 100 enters inlet chamber 46 through tube 48 and is immediately mixed with the dilution water that has completely filled hydroseparator 10. The force of slurry 100 and tangential entry causes it to swirl about inlet chamber 46 as depicted by the arrow labeled with the numeral 102. Inlet 40 allows slurry 100 to slow and to begin moving down prior to contacting the upflow as depicted by the arrows labeled with the numeral 110 in hydroseparator 10. As slurry 100 drops down through inlet 40, its velocity slows and the swirling motion decreases.

When slurry 100 drops out of inlet chamber 46, it is immediately mixed with the upflow in hydroseparator 10 created by adding dilution water to agitation section 24 and removing material from overflow outlet 72. Almost all of the flow in hydroseparator 10 is from agitation section 24 through intermediate section 22 into laminar flow section 20 and into outlet channel 70. There is preferably no flow from intermediate section 22 into agitation section 24. The flow rate of the upflow is closely controlled to create a drag force on the smaller fly ash particles sufficient to prevent the fly ash particles from settling down through the upflow. It is desired to have no net fluid flow into agitation section 24 from either mixing section 22 or laminar flow section 20. The flow rate of the upflow is not fast enough to cause the larger gypsum particles to rise with the upflow. The gravitational force on the larger gypsum particles causes them to drop, as indicated by the arrows labeled with numeral 106, into agitation section 24. The immediate and sudden mixture of downwardly moving slurry 102 with the upflow in hydroseparator 10 results in a significant separation of the fly ash particles from the gypsum particles in intermediate section 22. Even if some of the gypsum particles are initially moved upwardly from intermediate section 22 to the lower portions of laminar flow section 20, the laminar upflow in laminar flow section 20 allows gravity to overcome the drag forces and pull the larger gypsum particles back down through the upflow to intermediate section 22 and then into agitation section 24. The velocity of the upflow can be set by monitoring the overflow passing through overflow outlet 72. When hydroseparator 10 is started, dilution water is added to create the upflow and the flow rate of the dilution water is increased until the gypsum is detected in the overflow. The flow rate of the upflow is then backed off until the amount of fine gypsum solids in the overflow is within specifications. Various sight windows may also be provided in hydroseparator 10 to check the progress of the separation.

Although a significant amount of separation occurs in intermediate section 22, some of the finer fly ash particles reach the lower agitation section 24. These fly ash particles must be removed from the gypsum prior to allowing the gypsum to flow out of the underflow outlet 18. Dilution or wash water is added to agitation section 24 to dilute the concentration of fly ash solids in the liquid and to force this liquid to move upwards carrying with it the fly ash contaminants. Low shear agitator 58 is used to disperse the dilution water and to mix it well with the gypsum slurry so that the fly ash solids are displaced upward into intermediate section 22. Low shear agitator 58 and baffle 60 also insure that the gypsum remains fluid for washing and for removal from hydroseparator 10. The speed of agitator 58 as well as side baffle 60 cooperate to create a somewhat circular flow that extends from agitator 58 down towards floor 14, up sidewall 11 to bottom wall 30 where the flow is turned towards the center of hydroseparator 10 and back down into agitator 58. This substantially circular flow is indicated by the arrows labeled by the numeral 108. Because of the repeated passing of gypsum slurry through agitator 59, it is an important aspect of the present invention that agitator 58 rotates relatively slowly and with a low shear rate such that it does not generate small gypsum particles by crystal breakage. It is also important that bottom wall 30 provide the turning action required to keep all of the agitation forces within agitation section 24 and so that the upper section of hydroseparator 10 remain undisturbed by the kinetic energy provided by agitator 58.

The gypsum from the bottom of agitation section 24 is removed from hydroseparator 10 through underflow outlet 18. The gypsum removed from agitation section 24 is pure enough to use in high quality plasters and in commercial wall board operations.

One example of a use for hydroseparator 10 has been described above with respect to gypsum and fly ash. In one embodiment, the fly ash has a specific gravity in the approximate range of 2.4 to 3.2 while being present in particles having an approximate diameter of 10 microns. The gypsum has a specific gravity of 2.32 while having an approximate diameter of 70 microns and up. Hydroseparator 10 may be used to effectively separate the gypsum from the fly ash when the input feed rate of the slurry is in the approximate rate of 400 to 500 gallons per minute. The dilution water feed rate is then 100 to 300 gallons per minute. The underflow containing the gypsum is removed at approximately 100 gallons per minute with the remaining flow being taken out of the top of hydroseparator 10. Of course, the specific flow rates are determined by the exact concentrations of fly ash and gypsum and may be easily adjusted during the process.

Another example of a use for hydroseparator 10 is to separate clay from grit that is present in the clay. In this example, the clay has a particle size that is typically less than 15 microns while the grit that must be separated from the clay has a particle size range that is typically above 44 microns. The settling rate of the smallest grit particles is faster than the settling rate of the largest clay particles. Hydroseparator 10 may thus be used to create an upflow that allows the particles larger than about 44 microns to fall through the upflow into the agitation section while lifting the smaller particles upward with the upflow to be removed by the overflow of hydroseparator 10. In this situation, the desirable particles are being removed in the overflow while the undesirable grit is removed in the underflow.

In this situation the dilution water flow rate is approximately 25 gallons per minute with the withdrawal rate of the grit from agitation section 24 is approximately 10 gallons per minute. The net rise rate of water, or upflow, from agitation section 24 through laminar flow section 20 is approximately 15 gallons per minute. The opening in baffle 26 must thus be approximately 3 feet in diameter to give the desired upflow to prevent the clay from falling into agitation section 24. The height of hydroseparator 10 is desired to be approximately 22 feet to provide enough height to develop a uniform laminar flow for separation. The diameter of laminar flow section 20 of hydroseparator 10 must thus have a diameter of approximately 11 feet to create the desired rise rate through laminar flow section 20. This exemplary application simply provides an additional example of a use for hydroseparator 10 with the approximate dimensions needed to create hydroseparator 10 that is useful for separating fine clay from grit.

Figure 7:
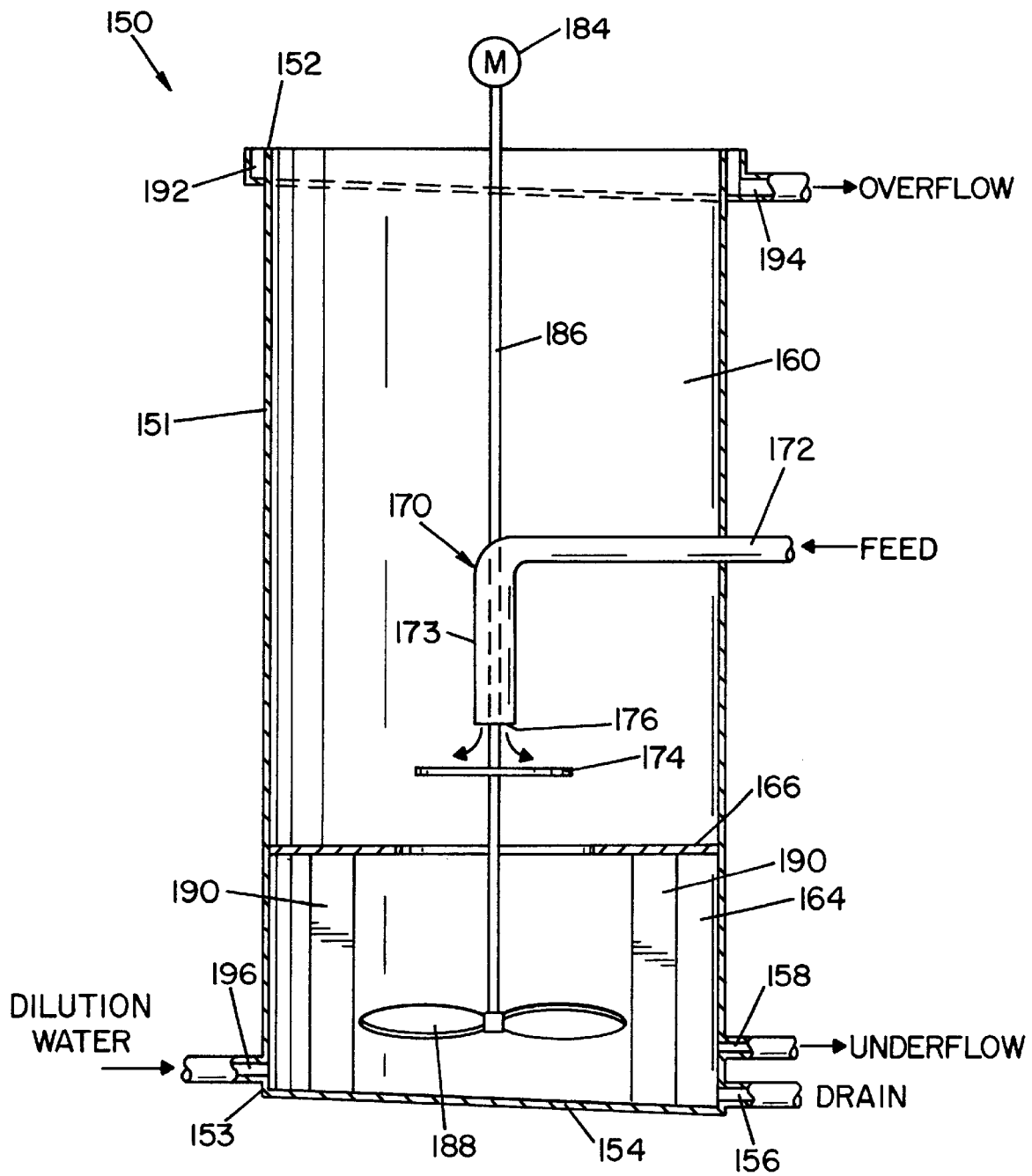
FIG. 7 is a front sectional view of an alternative embodiment of the hydroseparator of the present invention.

An alternative embodiment of the hydroseparator of the present invention is depicted in FIG. 7 and is indicated generally by the numeral 150. Hydroseparator 150 includes a generally cylindrical tank having a cylindrical sidewall 151 having an upper end 152 and a lower end 153. Lower end 153 of the tank is closed by a floor 154 to form the tank. Floor 154 may be sloped toward a drain 156 and an underflow outlet 158. Sidewall 151 and floor 154 may be fabricated from any of a variety of suitable materials known in the art such as aluminum, stainless steel, or plastic.

Hydroseparator 150 is divided into a laminar flow section 160 and an agitation section 164 by a baffle 166. Baffle 166 is a toroidal plate that provides an opening between agitation section 164 and laminar flow section 160 in substantially the center of the tank.

Hydroseparator 150 further includes an inlet 170 that is in fluid communication with the source of particles that are to be separated. Inlet 170 includes an inlet tube 172 that extends to the center of the tank in a substantially horizontal manner and then turns approximately 90 degrees so that inlet tube 172 is directed substantially vertically downward in a vertical portion 173. A velocity retarding member in the nature of a deflector plate 174 is supported by suitable means beneath the outlet 176 of inlet tube 172. Plate 174 deflects the slurry of particles that are input into the tank from inlet tube 172 radially outwardly where they lose their velocity and then tumble over the outer edge of plate 174 into the upflow of hydroseparator 150. Plate 174 thus prevents the input slurry from being directed immediately into the opening between laminar flow section 160 and agitation section 164. The diameter of plate 174 is preferably smaller than the diameter of the opening in baffle 166 so that most, if not all, of the material added to hydroseparator 150 will contact the upflow that moves from agitation section 164 to laminar flow section 160.

Hydroseparator 150 further includes a variable speed motor 184 that is positioned above hydroseparator 150. A drive shaft 186 is connected to motor 184 and extends down the middle of hydroseparator 150, through inlet tube 172, through plate 174, and into agitation section 164. A low shear agitator 188 is connected to the end of drive shaft 186 such that it is fully disposed within agitation section 164 and disposed adjacent lower surface 154 of hydroseparator 150. In other embodiments of the present invention, shaft 186 may pass adjacent to inlet tube 172 and may carry plate 174.

A plurality of side baffles 190 are disposed in agitation section 164. Each side baffle 190 is connected to the inner surface of sidewall 151 and extends into agitation section 164. Each side baffle 190 is substantially vertical and may be structurally similar to side baffles 60 described above. Side baffles 190 direct the flow in agitation section 164 from floor 154 up toward the bottom of baffle 166 where the flow is turned radially inwardly.

Hydroseparator 150 also includes an outlet channel 192 that is disposed at the top of hydroseparator 150. Outlet channel 192 is tilted toward an overflow outlet 194 such that particles that enter outlet channel 192 move down toward overflow outlet 194 and exit hydroseparator 150. Outlet channel 192 is structurally similar to outlet channel 70 described above.

The upflow in hydroseparator 150 is created by controlling the flows into and out of sections 160 and 164. Underflow outlet 158 is disposed in agitation section 164 and allows an underflow to be removed from hydroseparator 150. A dilution water or wash water inlet 196 is also disposed in agitation section 164. Inlet 196 is in selective, controlled fluid communication with the supply of dilution or wash water. The flow rates through inlet 170 and inlet 196 combined with the flow rates out of underflow outlet 158 and overflow outlet 192 define the flow rate of the upflow through hydroseparator 150. The upflow through hydroseparator 150 is controlled to separate the particles in the same manner as described above with respect to hydroseparator 10.

Figure 8:
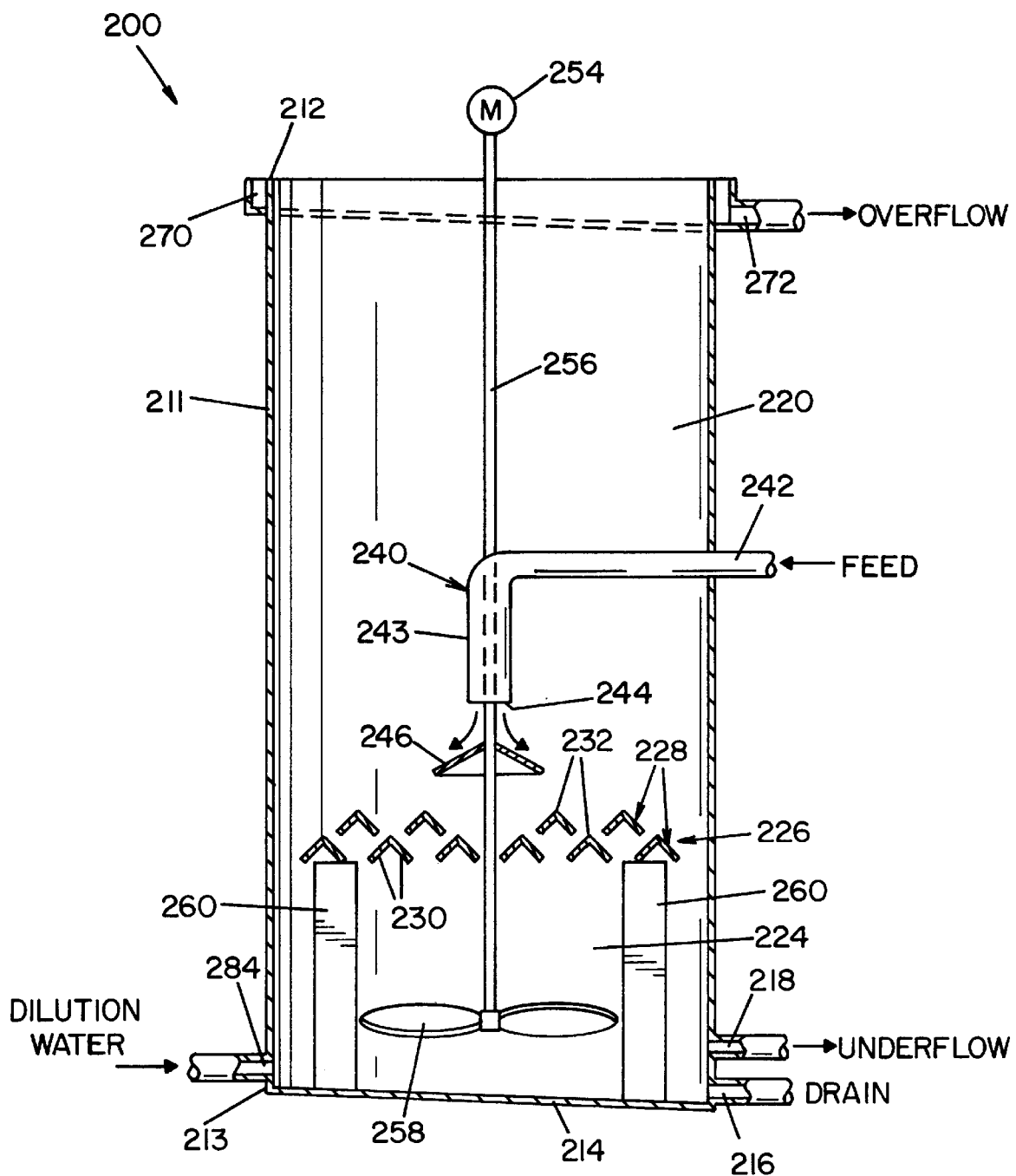
FIG. 8 is a front sectional view of a second alternative embodiment of the hydroseparator of the present invention.

The second alternative embodiment of the hydroseparator of the present invention is depicted in FIG. 8 and is indicated generally by the numeral 200. Hydroseparator 200 includes a generally cylindrical tank having a cylindrical sidewall 211 having an upper end 212 and a lower end 213. The tank is closed at its lower end 213 by a floor 214. Floor 214 may be sloped toward a drain 216 and an underflow outlet 218.

Hydroseparator 200 is divided into a laminar flow section 220 and an agitation section 224 by a baffle 226. Baffle 226 includes a plurality of substantially horizontal chevrons 228 that each have a pair of legs 230 joined at a common edge 232 that is directed upwardly with legs 230 sloped downwardly. Chevrons 228 are substantially parallel and disposed at the same level in hydroseparator 200.

In other embodiments of hydroseparator 200, a second layer of chevrons 228 may be added across hydroseparator 200. The additional layer includes a chevron 228 disposed between and above each pair of lower level chevrons 228. The additional layer prevents a direct path between agitation section 224 and laminar flow section 220 from being established. The additional layer of chevrons 228 are substantially parallel to the lower level of chevrons 228 and baffle 226. In yet other embodiments of the present invention, the additional layer of chevrons 228 may be disposed at an angle with respect to the lower level of chevrons 228. In still other embodiments of the invention, further additional layers of chevrons 228 may be added to hydroseparator 200 to provide the desired baffling effect in hydroseparator 200.

Hydroseparator 200 further includes an inlet 240 that is fluid communication with the source of particles that are to be separated. Inlet 240 includes an inlet pipe 242 that extends horizontally into the approximate center of hydroseparator 200, turns approximately 90 degrees downwardly, and then extends vertically downward with a vertical portion 243 to an inlet port 244. Inlet 240 further includes a velocity retarding member in the nature of an inlet plate 246 disposed directly below inlet port 244. Inlet plate 246 is conical with the top of the cone pointing towards inlet port 244 and the base of the cone pointed downward. Inlet plate 246 serves to disperse and slow the inlet slurry when it is introduced into hydroseparator 200 from inlet pipe 242. Inlet plate 246 may be supported in the desired location by any of a variety of known means such as supports that extend radially from sidewall 211.

Hydroseparator 200 further includes a variable speed motor 254 that is positioned above hydroseparator 200. A drive shaft 256 is connected to motor 254 and extends down the middle of hydroseparator 200, through or adjacent to inlet 240, and into agitation section 224. A low shear agitator 258 is connected to the end of drive shaft 256 such that it is fully disposed within agitation section 224 and disposed adjacent lower surface 214 of hydroseparator 200.

A plurality of side baffles 260 are disposed in agitation section 224. Side baffles 260 may be structurally similar to side baffles 60 described above or an equivalent structure that extends into agitation section 224 to prevent or inhibit a swirling flow from developing about the axis of shaft 256. Side baffles 260 direct the flow in agitation section 224 from floor 214 up toward baffle 226 where the flow is turned radially inwardly toward shaft 256. The flow then extends back down toward agitator 258.

Hydroseparator 200 also includes an outlet channel 270 that is disposed at the top of hydroseparator 200. Outlet channel 270 is tilted toward an overflow outlet 272 such that particles that enter outlet channel 270 move down toward overflow outlet 272 and exit hydroseparator 200.

The upflow in hydroseparator 200 is created by controlling the flows into and out of sections 220 and 224. Underflow outlet 218 is disposed in agitation section 224 and allows an underflow to be removed from hydroseparator 200. A dilution water or wash water inlet 284 is also disposed in agitation section 224. Inlet 284 is in selective, controlled fluid communication with a supply of dilution or wash water. The flow rates through inlet 240 and inlet 284 combined with the flow rates out of underflow outlet 218 and overflow outlet 272 define the flow rate of the upflow through hydroseparator 200. The flow rate of the upflow is controlled such that the particles having a fast settling rate fall through baffle 226 into agitation section 224 while the particles having the slower settling rate rise with the upflow and are removed in the overflow.

Figure 9:
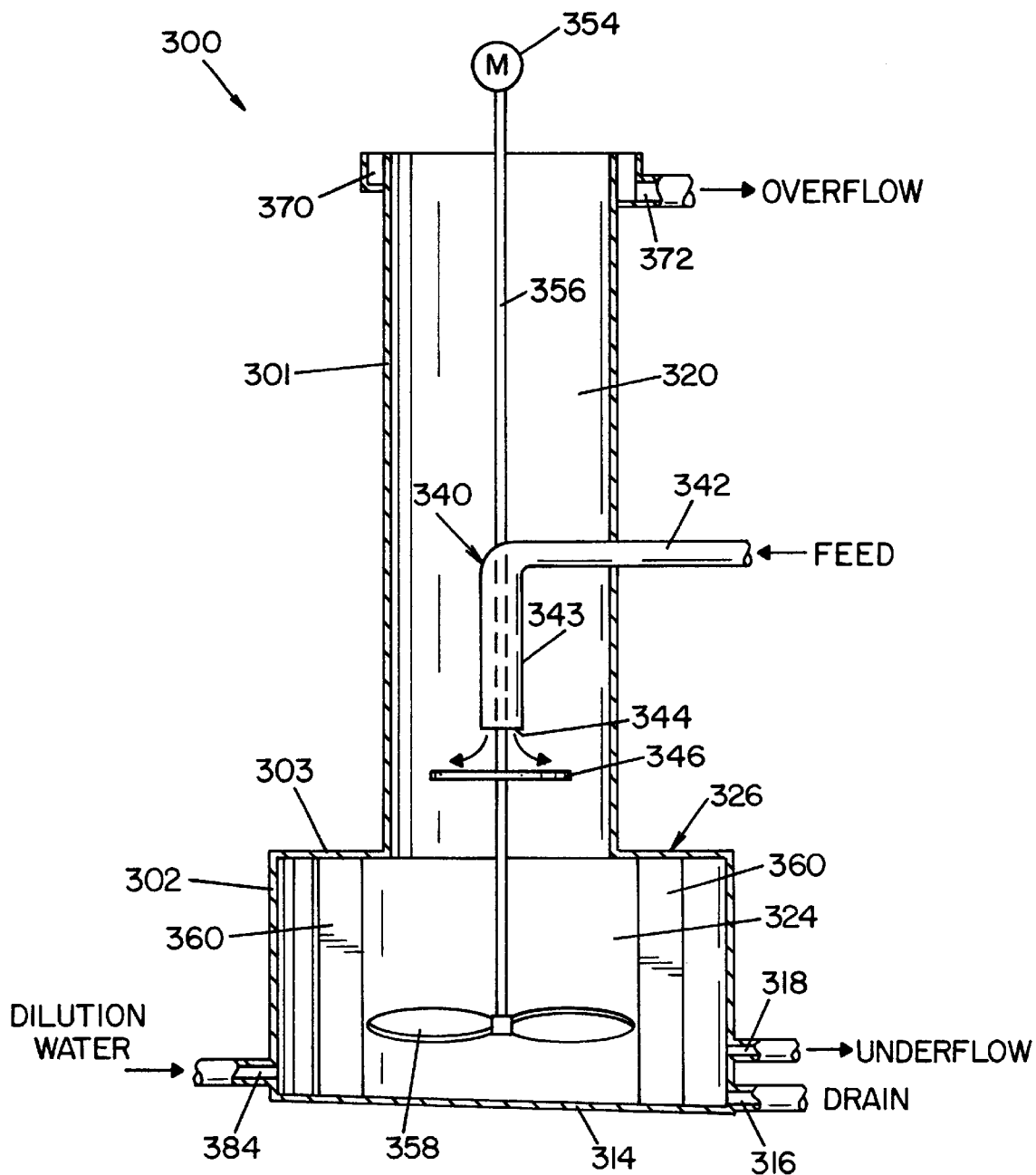
FIG. 9 is a front sectional view of a third alternative embodiment of the hydroseparator of the present invention.

A third alternative embodiment of the hydroseparator of the present invention is depicted in FIG. 9 and is indicated generally by the numeral 300. Hydroseparator 300 includes a tank having a pair of cylindrical portions defined by a first cylindrical sidewall 301 and a second cylindrical sidewall 302. The diameter of wall 301 being less than the diameter of wall 302. The bottom of first cylindrical sidewall 301 is joined to the top of second cylindrical sidewall 302 by a toroidal intermediate wall 303 that is substantially horizontal. The bottom of second cylindrical sidewall 302 is closed by a floor 314 to form a tank. Floor 314 may be sloped toward a drain 316 and an under flow outlet 318.

Hydroseparator 300 is thus divided into a laminar flow section 320 and an agitation section 324 by wall 303 which functions as a baffle 326. Baffle 326 provides a barrier to fluid in agitation section 324 keeping the particles in agitator section 324 from easily flowing into laminar flow section 320 as well as preventing the laminar flow in section 320 from being disturbed.

Hydroseparator 300 further includes an inlet 340 that is fluid communication with the source of particles that are to be separated. Inlet 340 includes an inlet pipe 342 that extends substantially horizontally into the approximate center of hydroseparator 300, turns approximately 90 degrees downward, and then extends vertically downward in a vertical portion 343 to an inlet port 344. Inlet port 344 is disposed directly above a velocity retarding member in the nature of an inlet plate 346. Inlet plate 346 serves to slow the slurry as it arrives in hydroseparator 300 and to disperse the input slurry as it is input into hydroseparator 300. Inlet plate 346 may be supported below inlet port 344 by any of a variety of suitable supports such as radial supports that extend from sidewall 301.

Hydroseparator 300 further includes a variable speed motor 354 that is positioned above hydroseparator 300. A drive shaft 356 is connected to motor 354 and extends down the middle of hydroseparator 300, through or adjacent to inlet 340, and into agitation section 324. A low shear agitator 358 is connected to the end of drive shaft 356 such that it is fully disposed within agitation section 324 and disposed adjacent lower surface 314. Plate 346 may be supported by shaft 356.

A plurality of side baffles 360 are disposed in agitation section 324 extending from sidewall 302. Side baffles 360 function similarly to the side baffles described above with respect to the other embodiments of the present invention. Hydroseparator 300 further includes an outlet channel 370 that is disposed at the top of hydroseparator 300. Outlet channel 370 is tilted toward an overflow outlet 372 such that particles that enter outlet channel 370 move down toward overflow outlet 372 and exit hydroseparator 300.

The upflow in hydroseparator 300 is created by controlling the flows into and out of sections 320 and 324. Underflow outlet 318 is disposed in agitation section 324 and allows an underflow to be removed from hydroseparator 300. A dilution or wash water inlet 384 is also disposed in agitation section 324. Inlet 384 is in selective, controlled fluid communication with a supply of dilution or wash water. The flow rates through inlet 340 and inlet 384 combined with the flow rates out of underflow outlet 318 and overflow outlet 372 define the flow rate of the upflow through hydroseparator 300. The flow rate of the upflow through hydroseparator 300 is controlled such that the particles having a faster settling rate fall down through the upflow into agitation section 324 where they are removed by the underflow. The same upflow lifts the particles having the slower settling rates to overflow outlet 372.

Figure 10:
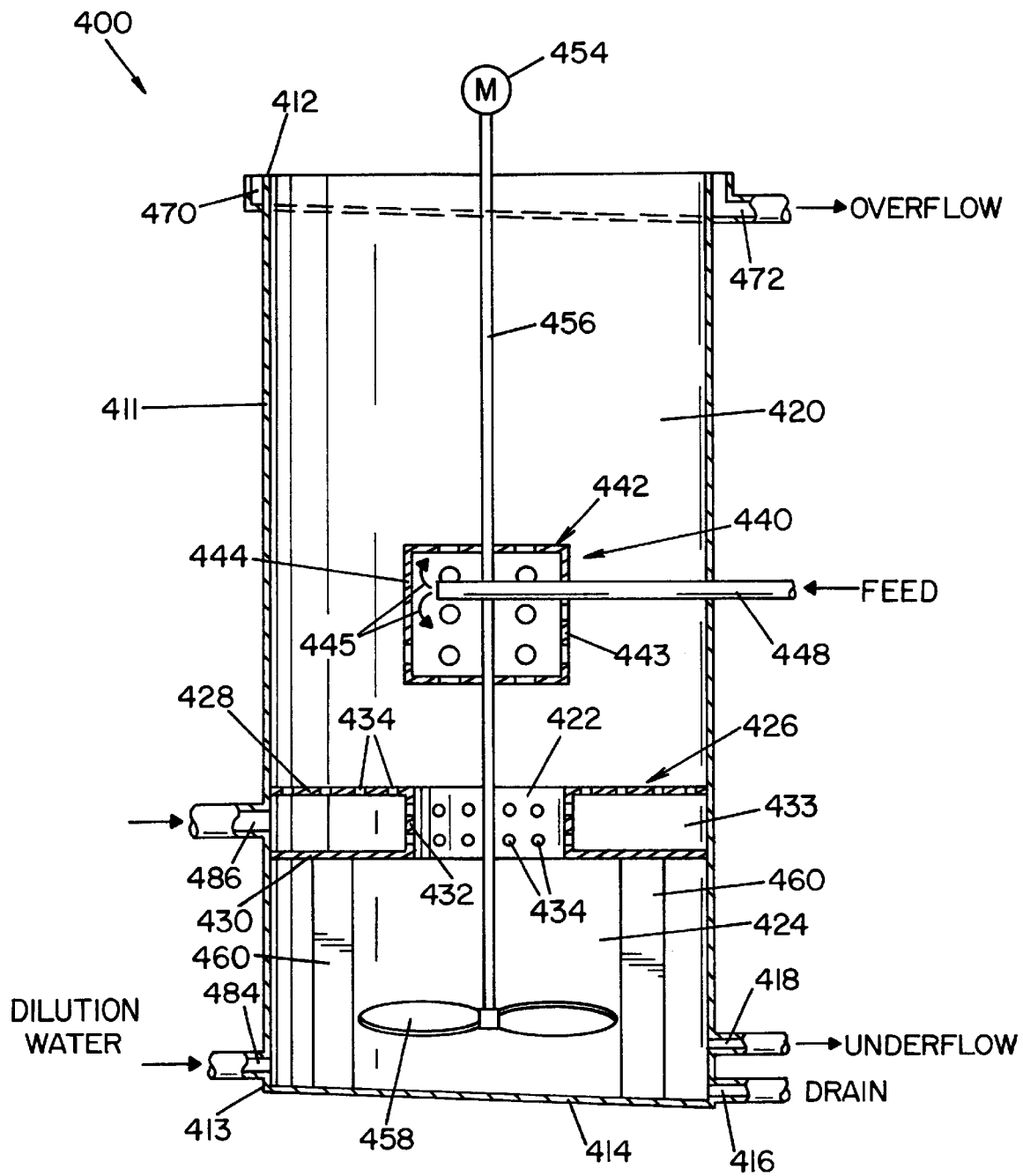
FIG. 10 is a front sectional view of a fourth alternative embodiment of the hydroseparator of the present invention.

A fourth alternative embodiment of the hydroseparator of the present invention is depicted in FIG. 10 and is indicated generally by the numeral 400. Hydroseparator 400 includes a generally cylindrical tank having a cylindrical sidewall 411 with an upper end 412 and a lower end 413. Lower end 413 is closed by a floor 414 to form the tank. Floor 414 may be sloped toward a drain 416 and an underflow outlet 418.

Hydroseparator 400 is divided into a laminar flow section 420 and an agitation section 424 by a circumferential baffle 426. Baffle 426 is toroidal in shape and extends entirely about the inner surface of sidewall 411. In the embodiment of the invention depicted in FIG. 10, the cylindrically-shaped area radially inward of baffle 426 provides an intermediate or transition section 422 disposed between agitation section 420 and laminar flow section 424. Baffle 426 includes a top wall 428 and a bottom wall 430 that are connected at their inner edges by an inner wall 432. Top wall 428, bottom wall 430, and inner wall 432 cooperate with sidewall 411 to form a dilution water inlet chamber 433. Top wall 428 and inner wall 432 are perforated by a plurality of holes 434 that allow dilution or wash water to be input through baffle 426 as will be described in more detail below.

Hydroseparator 400 further includes an inlet 440 that is fluid communication with the source of particles that are to be separated. Inlet 440 includes a velocity retarding member in the nature of an inlet box 442 that is fabricated from a plurality of perforated walls 443. At least one of the walls has a solid portion 444 where the slurry is initially directed as is indicated by the arrows labeled by the numeral 445. The slurry is directed against solid portion 444 by an inlet tube 448 that extends substantially horizontally through hydroseparator 400 into box 442 and adjacent portion 444. The configuration of inlet 440 causes the particles being input into hydroseparator 400 to lose velocity and kinetic energy and start to settle prior to entering the upflow in hydroseparator 400. Inlet tube 448 in box 442 may be supported in hydroseparator 400 by any of a variety of suitable means.

Hydroseparator 400 further includes a variable speed motor 454 that is positioned above hydroseparator 400. A drive shaft 456 is connected to motor 454 and extends down the middle of hydroseparator 400, through inlet box 442, and into agitation section 424. A low shear agitator 458 is connected to the end of drive shaft 456 such that it is fully disposed within agitation section 424 and disposed adjacent lower surface 414.

A plurality of side baffles 460 are disposed in agitation section 424. Side baffles 460 function to control the flow in agitation section 424 as described above with respect to the other embodiments of the invention. Hydroseparator 400 also includes an outlet channel 470 that is disposed at the top of hydroseparator 400. Outlet channel 470 is tilted toward an overflow outlet 472 such that particles that enter outlet channel 470 move down toward overflow outlet 472 and exit hydroseparator 400.

The upflow in hydroseparator 400 is created by controlling the flows into and out of sections 420, 422, and 424. Underflow outlet 418 is disposed in agitation section 424 and allows an underflow to be removed from hydroseparator 400. Dilution water inlets 484 and 486 are provided to allow dilution or wash water to be added to hydroseparator 400. First inlet 484 is disposed adjacent bottom wall 414 in agitation section 424. First inlet 484 allows dilution water to be added directly into agitation section 424. Second inlet 486 is in fluid communication with chamber 433 such that dilution water enters chamber 433 and exits into intermediate section 422 or laminar flow section 420 through walls 428 or 432. The amount of dilution water input into hydroseparator 400 through each input 484 and 486 may be controlled based on the particles to be separated. The flow rates through inlet 440 and inlets 484 and 486 combined with the flow rates out of underflow outlet 418 and overflow outlet 472 define the flow rate of the upflow through hydroseparator 400. The flow rate of the upflow is controlled to cause the particles having the faster settling rates to fall into agitation section 424 where they are removed with the underflow and lift the particles having the slower settling rate to outlet 472 where they are removed in the overflow.

Accordingly, the improved method and apparatus for separating fast settling particles from slow settling particles is simplified, provides an effective, safe, inexpensive, and efficient device and method which achieves all the enumerated objectives, provides for eliminating difficulties encountered with prior devices and methods, and solves problems and obtains new results in the art.

In the foregoing description, certain terms have been used for brevity, clearness, and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the method and apparatus is constructed and used, the characteristics of the construction, and the advantageous new and useful results obtained; the new and useful structures, devices, elements, arrangements, parts, and combinations are set forth in the appended claims.

What is claimed is:

1. A hydroseparator, comprising:

a sidewall having an upper end and lower end;

a floor connected to said lower end of said sidewall, said floor closing the bottom of the sidewall to form a tank;

a baffle connected to said tank to divide said tank into an agitation section and a laminar flow section, wherein the baffle forms a frustum-shaped intermediate section, said baffle having an upper wall and a lower wall, said lower wall being substantially perpendicular to said sidewall;

said agitation section being disposed below said baffle;

said laminar flow section being disposed above said baffle;

said tank having a first inlet, and overflow outlet, and an underflow outlet; said overflow outlet being disposed adjacent said upper end of said sidewall; said underflow outlet being disposed adjacent said lower end of said sidewall and said first inlet being disposed above said agitation section;

an agitator disposed in said agitation section; and means for driving said agitator.

2. A hydroseparator, comprising:

a sidewall having an upper end and a lower end;

a floor connected to said lower end of said sidewall, said floor closing the bottom of the sidewall to form a tank;

a baffle connected to said tank to divide said tank into an agitation section and a laminar flow section;

said agitation section being disposed below said baffle;

said laminar flow section being disposed above said baffle;

a plurality of side baffles connected to said sidewall and extending into said agitation section, said side baffles including a pair of vertical walls joined at one edge, said joined edges extending into said agitation section, wherein said side baffles extend upwardly from said floor and are evenly dispersed about said agitation section;

said tank having a first inlet, an overflow outlet, and an underflow outlet;

said overflow outlet disposed adjacent said upper end of said sidewall;

said underflow outlet disposed adjacent said lower end of sidewall;

said first inlet disposed above said agitation section;

an agitator disposed in said agitation section; and means for driving said agitator.

* * * * *